United States Patent
Fraley, Jr. et al.

(10) Patent No.: US 6,237,464 B1
(45) Date of Patent: *May 29, 2001

(54) CENTERING MECHANISM FOR A POWER STEERING CONTROL VALVE

(75) Inventors: Richard R. Fraley, Jr., Shelby Township; Michael J. Damore, Sterling Heights, both of MI (US)

(73) Assignee: TRW Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,009

(22) Filed: Jan. 16, 1998

(51) Int. Cl.$^7$ ........................................ F15B 9/10
(52) U.S. Cl. ................................. 91/375 R; 137/625.23
(58) Field of Search .................. 91/375 R; 137/625.23; 251/313

(56) References Cited

U.S. PATENT DOCUMENTS

| | | | |
|---|---|---|---|
| 2,360,987 | * 10/1944 | Temple | 137/625.23 |
| 2,939,429 | * 6/1960 | Charlson | 91/375 R |
| 4,877,100 | 10/1989 | Emori et al. | |
| 5,230,273 | 7/1993 | Fraley, Jr. | |
| 5,251,669 | * 10/1993 | Bishop | 137/625.23 |
| 5,562,016 | 10/1996 | Schoffel | |
| 5,571,238 | 11/1996 | Breitweg et al. | |
| 5,964,315 | 10/1999 | Suzuki et al. | 91/375 A |

FOREIGN PATENT DOCUMENTS 2044697   10/1980   (GB).

* cited by examiner

Primary Examiner—F. Daniel Lopez
(74) Attorney, Agent, or Firm—Tarolli, Sundheim, Covell, Tummino & Szabo L.L.P.

(57) ABSTRACT

An apparatus (18) includes first and second relatively rotatable valve members (60, 62) and a centering mechanism (120). The valve members (60, 62) are configured to direct hydraulic fluid between the valve members (60, 62) in accordance with their rotational positions. The centering mechanism (120) includes a movable detent member (126), a spring (142), and a cam surface (128). The cam surface (128) is rotatable with one of the valve members (60, 62) so as to cam the detent member (126) against a bias of the spring (142) upon rotation of the valve members (60, 62) from centered positions. The cam surface (128) has a central portion (130) defining a recess (134) in which the detent member (126) rests when the valve members (60, 62) are in the centered positions. The cam surface (128) further has a pair of side portions (132) on opposite sides of the recess (134).

5 Claims, 4 Drawing Sheets

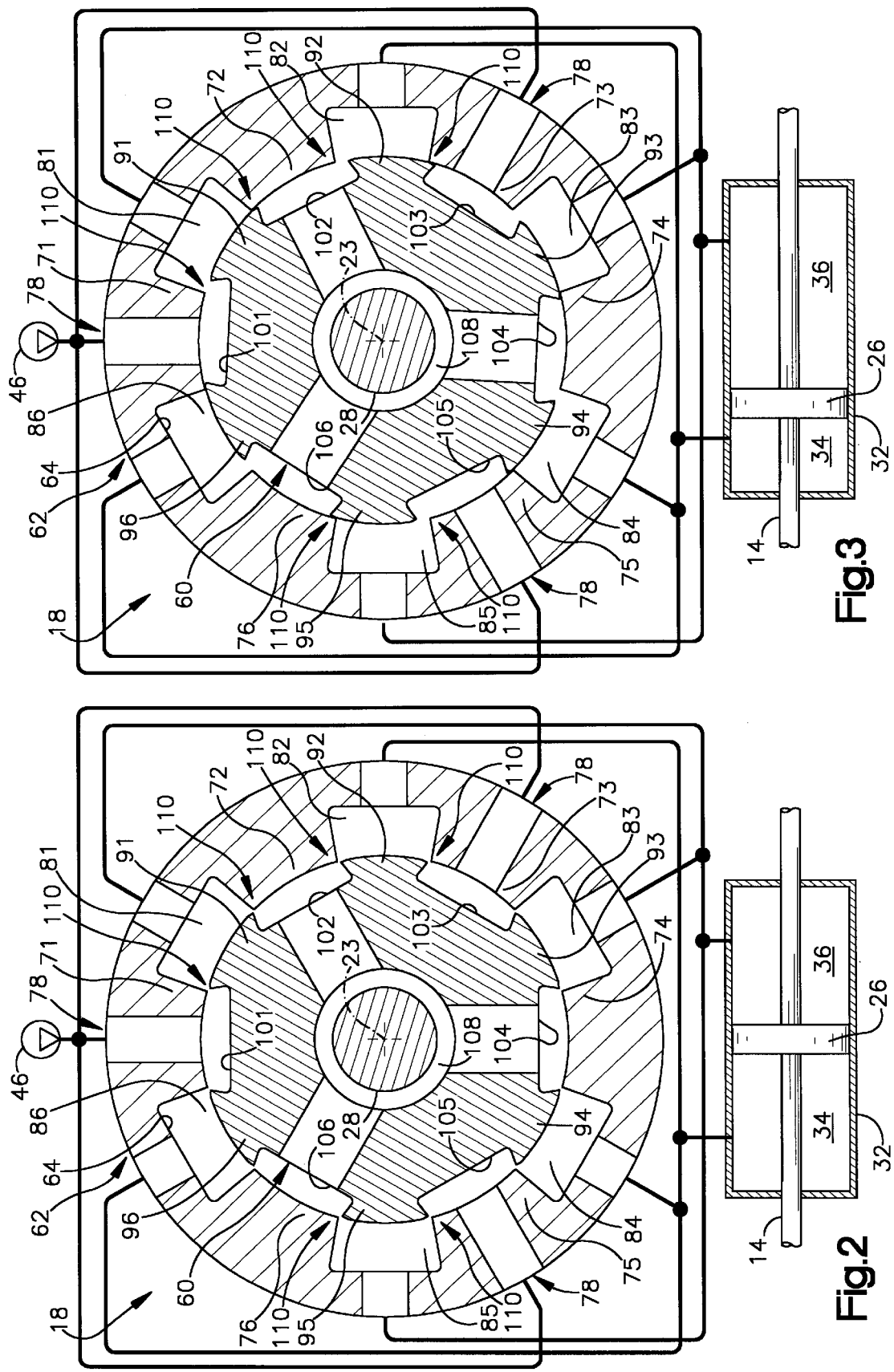

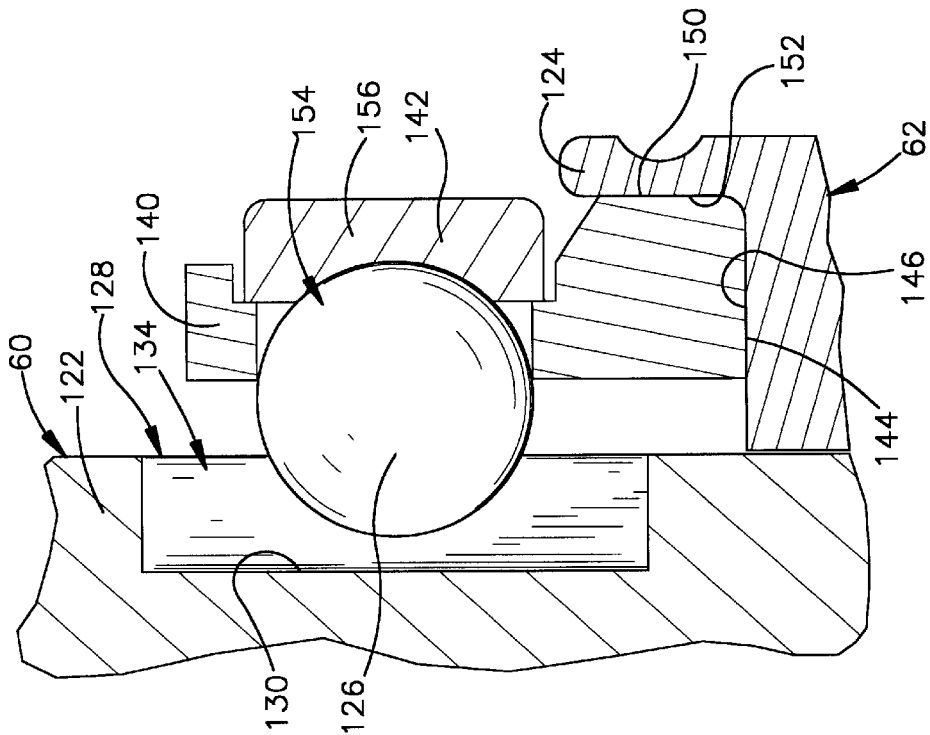
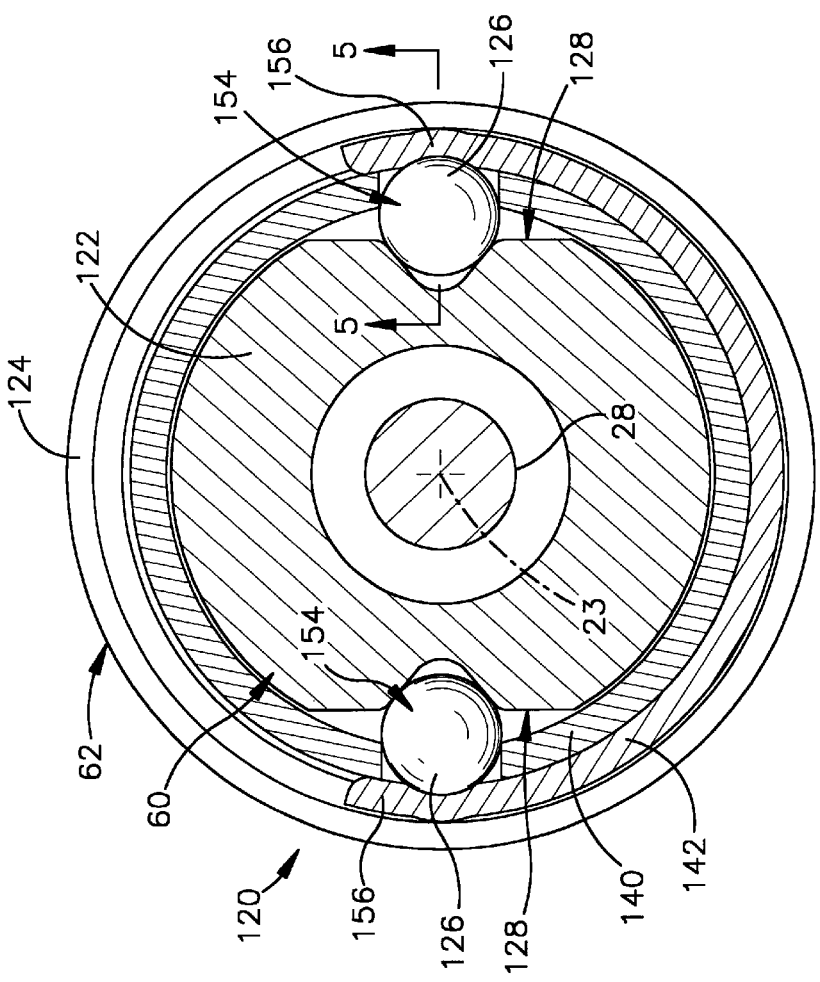

CENTERING MECHANISM FOR A POWER STEERING CONTROL VALVE

FIELD OF THE INVENTION

The present invention relates to a hydraulic fluid control valve for a power steering gear.

BACKGROUND OF THE INVENTION

A known hydraulic fluid control valve for a power steering gear includes a valve core rotatable within a valve sleeve. The core and the sleeve control the pressure of hydraulic fluid flowing through the valve between a pump, a reservoir, and a pair of opposed fluid chambers in a hydraulic motor. When the core and the sleeve are in centered positions, the hydraulic fluid pressures in the opposed fluid chambers are equal. When the core and the sleeve are rotated from the centered positions, a plurality of lands and grooves on the core and the sleeve cooperate to increase the hydraulic fluid pressure in one of the opposed fluid chambers, and thereby to provide hydraulic power steering assist in the steering gear.

Such a valve may also include a centering mechanism. The centering mechanism resists rotation of the core and the sleeve from their centered positions, and urges them to return to their centered positions.

SUMMARY OF THE INVENTION

In accordance with the present invention, an apparatus comprises first and second relatively rotatable valve members and a centering mechanism. The valve members are configured to direct hydraulic fluid between the valve members in accordance with their rotational positions. The centering mechanism includes a movable detent member, a spring, and a cam surface. The cam surface is rotatable with one of the valve members so as to cam the detent member against a bias of the spring upon rotation of the valve members from centered positions.

The cam surface has a central portion defining a recess in which the detent member rests when the valve members are in the centered positions. The cam surface further has a pair of side portions on opposite sides of the groove.

A centering mechanism constructed in accordance with the present invention can function in two stages. This feature of the invention is accomplished by the configuration of the cam surface. When the valve members are initially rotated from the centered positions, the central portion of the cam surface engages the detent member so as to cam the detent member outward from the recess against the bias of the spring. The restoring force exerted by the spring increases at a first rate in accordance with the angle at which the central portion of the cam surface opposes the restoring force of the spring. If the valve members are rotated sufficiently for the cam surface to cam the detent member fully out of the recess, one of the side portions of the cam surface will move against the detent member to cam the detent member further against the bias of the spring. The restoring force of the spring will then increase at a second, lower rate in accordance with a greater angle at which the side portion of the cam surface opposes the restoring force. In a hydraulic power steering gear, the centering mechanism can thus function in a first stage in which the restoring force increases at a first rate for relatively low steering angles, and subsequently in a second stage in which the restoring force increases at a second, lower rate for relatively greater steering angles.

BRIEF DESCRIPTION OF THE DRAWINGS

Further features of the present invention will become apparent to those skilled in the art to which the present invention relates from reading the following description with reference to the accompanying drawings, in which:

FIG. 2 is a view of parts of the apparatus of FIG. 1, with certain parts being shown in section and with other parts being shown schematically;

FIG. 3 is a view similar to FIG. 2 showing parts in different positions;

FIG. 4 is a sectional view of parts of the apparatus of FIG. 1;

FIG. 5 is a view taken on line 5—5 of FIG. 4;

DESCRIPTION OF A PREFERRED EMBODIMENT

Figure 1:
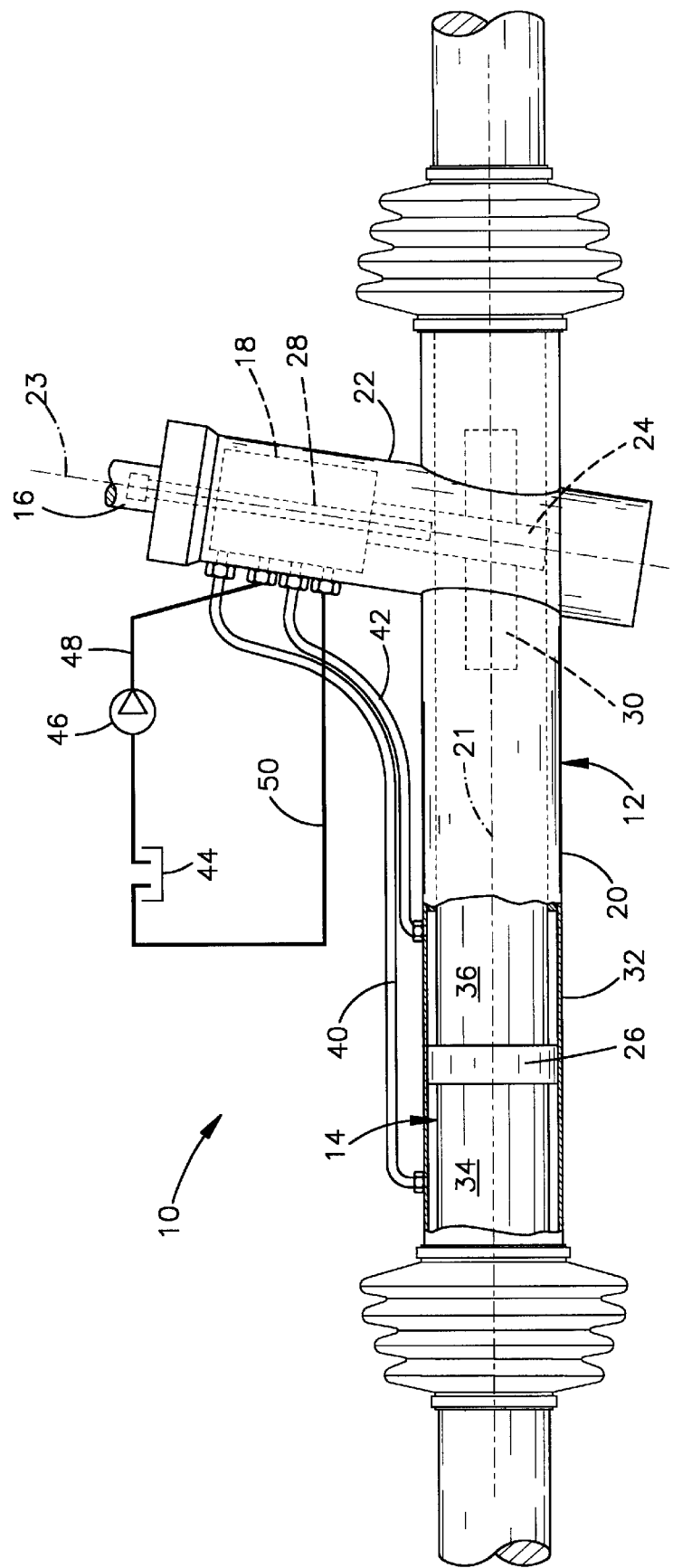
FIG. 1 is a view of a vehicle steering apparatus comprising a preferred embodiment of the present invention.
Figure 6:
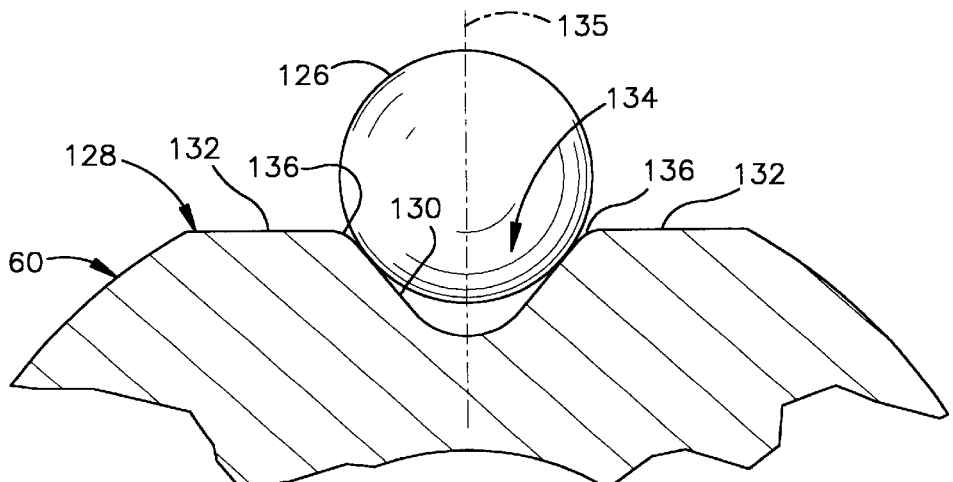
FIG. 6 is an enlarged partial view of parts shown in FIG. 4.

A steering gear 10 comprising a preferred embodiment of the present invention is shown in FIG. 1. The steering gear 10 is a hydraulically-assisted rack and pinion steering gear including a housing 12, a steering rack 14, and an input shaft 16. As shown schematically in FIG. 1, the steering gear 10 further includes a hydraulic fluid control valve 18 which is contained in the housing 12.

The rack 14 extends longitudinally through a lower portion 20 of the housing 12 along a horizontal axis 21, and is supported for movement relative to the housing 12 along the axis 21. When the steering gear 10 is installed in a vehicle, the opposite ends (not shown) of the rack 14 are connected to steering linkages which, in turn, connect the steering gear 10 to a pair of steerable vehicle wheels. The input shaft 16 projects outward from an upper portion 22 of the housing 12 along another axis 23, and is rotatable about the axis 23 in response to rotation of the vehicle steering wheel.

Other parts of the steering gear 10 include a pinion gear 24 and a piston 26. The pinion gear 24 is connected with the input shaft 16 by a torsion bar 28, and is supported for rotation about the axis 23 in meshing engagement with a row of rack teeth 30 on the rack 14. A tubular section 32 of the lower housing portion 20 functions as a power cylinder. The piston 26 is fixed to the rack 14 within the power cylinder 32. A pair of variable volume hydraulic fluid chambers 34 and 36 are located in the power cylinder 32 on opposite sides of the piston 26.

The valve 18 communicates with the first chamber 34 in the power cylinder 32 through a first two-way conduit 40. The valve 18 communicates with the second chamber 36 in the power cylinder 32 through a second two-way conduit 42. As further shown schematically in FIG. 1, the valve 18 receives hydraulic fluid from a reservoir 44 and a pump 46 through an inlet conduit 48. An outlet conduit 50 exhausts hydraulic fluid from the valve 18 to the reservoir 44.

The valve 18 operates in response to rotation of the input shaft 16 with the steering wheel. When the input shaft 16 rotates with the steering wheel in a first direction about the axis 23, it rotates slightly relative to the pinion gear 24. The torsion bar 28 flexes to permit such rotation of the input shaft 16 relative to the pinion gear 24. The valve 18 responds to the resulting rotational displacement by opening hydraulic fluid flow paths that extend through the valve 18 from the inlet conduit 48 to the first two-way flow conduit 40. The valve 18 simultaneously opens hydraulic fluid flow paths that extend through the valve 18 from the second two-way flow conduit 42 to the outlet conduit 50. As a result, the valve 18 communicates the pump 46 with the first chamber 34 in the power cylinder 32 to pressurize the first chamber 34, and simultaneously communicates the second chamber 36 in the power cylinder 32 with the reservoir 44 to exhaust the second chamber 36. A resulting flow of hydraulic fluid from the pump 46, and a resulting hydraulic fluid pressure differential acting across the piston 26, cause the piston 26 and the rack 14 to move to the right, as viewed in FIG. 1, along the axis 21. This causes the steering linkage to steer the vehicle wheels in a first direction.

As the rack moves along the axis 21 with the piston 26, the pinion gear 24 rotates in meshing engagement with the rack teeth 30. The pinion gear 24 thus rotates about the axis 23 relative to the input shaft 16 in a follow-up manner so as to cancel the rotational displacement between the pinion gear 24 and the input shaft 16. The valve 18 responds by closing the previously opened hydraulic fluid flow paths. This equalizes the hydraulic fluid pressures acting on the piston 26 in the two chambers 34 and 36 in the power cylinder 32, and causes the piston 26 and the rack 14 to stop moving along the axis 21.

When the vehicle wheels are to be steered in an opposite direction, the input shaft 16 is rotated with the steering wheel in an opposite direction about the axis 23. The input shaft 16 is again rotated slightly relative to the pinion gear 24 upon flexing of the torsion bar 28. The valve 18 responds by pressurizing the second chamber 36 and by simultaneously exhausting the first chamber 34. The piston 26 and the rack 14 then move axially to the left, as viewed in FIG. 1. A resulting follow-up rotation of the pinion gear 24 relative to the input shaft 16 causes the valve 18 again to equalize the hydraulic fluid pressures in the two chambers 34 and 36 in the power cylinder 32. In this manner, the steering gear 10 steers the vehicle wheels in directions and amounts corresponding to the directions and the amounts of rotation of the steering wheel and the input shaft 16.

As shown in FIG. 2, the valve 18 includes a valve core 60 and a valve sleeve 62. Both the core 60 and the sleeve 62 have generally cylindrical shapes centered on the axis 23. The core 60 is defined by a section of the input shaft 16 (FIG. 1). The sleeve 62 is connected with an upper end portion of the pinion gear 24 (FIG. 1). Accordingly, the core 60 and the sleeve 62 rotate relative to each other when the input shaft 16 and the pinion gear 24 rotate relative to each other. The core 60 and the sleeve 62 then vary the hydraulic fluid flow paths extending through the valve 18 so that certain flow paths become relatively restricted and certain flow paths become relatively unrestricted. Pressurized flows of hydraulic fluid are thereby directed through the valve 18 between the pump 46 and the chambers 34 and 36 in the power cylinder 32, as described above with reference to FIG. 1.

The sleeve 62 has a radially inner periphery 64 extending circumferentially around the core 60. The inner periphery 64 of the sleeve 62 has an undulating contour defined by a plurality of circumferentially spaced lands and grooves. Many different arrangements of lands and grooves can be used in a hydraulic fluid control valve like the valve 18. For example, the sleeve 62 in the preferred embodiment of the present invention has six lands 71, 72, 73, 74, 75 and 76 which are equally spaced from each other circumferentially about the axis 23. The sleeve 62 further has six grooves 81, 82, 83, 84, 85 and 86, each of which is located circumferentially between a pair of adjacent lands.

Three inlet ports 78 extend radially inward through the sleeve 62 at the locations of the first land 71, the third land 73, and the fifth land 75. As shown schematically in FIG. 2, the inlet ports 78 receive hydraulic fluid from the pump 46.

As further shown schematically in FIG. 2, the grooves 81–86 on the sleeve 62 communicate with the fluid chambers 34 and 36 in the power cylinder 32. The first, third and fifth grooves 81, 83 and 85 communicate with the chamber 36 on the right side of the piston 26, as viewed in FIG. 2. The second, fourth and sixth grooves 82, 84 and 86 communicate with the chamber 34 on the left side of the piston 26.

The core 60 also has an undulating contour defined by a plurality of lands and grooves. In the preferred embodiment, the core 60 has six lands 91–96 and six grooves 101–106. The lands 91–96 on the core 60 are located radially opposite the grooves 81–86 on the sleeve 62. The grooves 101–106 on the core 60 are located radially opposite the lands 71–76 on the sleeve 62. Accordingly, the adjacent corners of the lands 71–76 and 91–96 define orifices 110 between the grooves 81–86 and 101–106. Three of the grooves 102, 104 and 106 on the core 60 communicate with the reservoir 44 (FIG. 1) through corresponding branches of a return port system 108 extending through the core 60.

When a steering maneuver is not being performed, the core 60 and the sleeve 62 are located in rotationally centered positions, as shown in FIG. 2. Hydraulic fluid then flows from the inlet ports 78 to the return port system 108 through the grooves 101–106, the grooves 81–86, and the orifices 110. This flow results from a pressure drop between the pump 46 and the reservoir 44. However, there is no pressure differential between the chambers 34 and 36 in the power cylinder 32 when a steering maneuver is not being performed. Accordingly, there is no pressure drop between the set of grooves 81, 83 and 85 that communicate with the right chamber 36 and the other set of grooves 82, 84 and 86 that communicate with the left chamber 34. The valve 18 thus has a neutral condition when the core 60 and the sleeve 62 are in the centered positions.

When the steering wheel and the input shaft 16 (FIG. 1) are turned to the right, the core 60 rotates relative to the sleeve 62 in a clockwise direction, as viewed in FIG. 2. The core 60 thus moves relative to the sleeve 62 from the centered position of FIG. 2 to a rotationally shifted position, as shown by way of example in FIG. 3. Six of the twelve orifices 110 are then enlarged, and the other six orifices 110 are simultaneously constricted. This causes the pressure to increase in the set of grooves 81, 83 and 85 that communicate with the right chamber 36 in the power cylinder 32, and simultaneously causes the pressure to decrease in the set of grooves 82, 84 and 86 that communicate with the left chamber 34. A small portion of the hydraulic fluid flow from the inlet ports 78 to the return port system 108 is then diverted to the right chamber 36 through the grooves 81, 83 and 85. An equal flow of hydraulic fluid is simultaneously exhausted from the left chamber 34 to the other grooves 82, 84 and 86. The piston 26 and the rack 14 then move to the left, as viewed in FIG. 3. This causes the steering linkages to turn the vehicle wheels for a right turn. Conversely, counterclockwise rotation of the sleeve 60 from the centered position of FIG. 2 provides hydraulic fluid power for a left turn.

The valve 18 further includes a centering mechanism 120 (FIGS. 4–8). The centering mechanism 120 acts between the core 60 and the sleeve 62 at a location spaced axially from the lands and grooves shown in FIG. 2. Specifically, as shown in FIGS. 4 and 5, the centering mechanism 120 is interposed between an upper portion 122 of the core 60 and a terminal upper end portion 124 of the sleeve 62.

The centering mechanism 120 includes a pair of movable detent members in the form of steel balls 126. The centering mechanism 120 further includes a pair of cam surfaces 128 which are formed on the upper portion 122 of the core 60 at diametrically opposed locations. As shown in the enlarged view of FIG. 6, each cam surface 128 has a central portion 130 and a pair of opposite side portions 132. The central portion 130 of each cam surface 128 has a trough shaped contour defining an axially elongated recess 134. The side portions 132 of each cam surface 128 are preferably coplanar and perpendicular to a line 135 extending diametrically across the core 60. However, a cam surface constructed in accordance with the present invention could alternatively have either planar or arcuate side portions that diverge from the central portion. Each cam surface 128 further has a pair of arcuate transition portions 136 between the central portion 130 and the respective side portions 132. The balls 126 rest in the recesses 134 when the core 60 and the sleeve 62 are in the rotationally centered positions.

Other parts of the centering mechanism 120 include a pilot ring 140 and a C-spring 142. The pilot ring 140 is centered on the axis 23, and is mounted immovably on the terminal upper end portion 124 of the sleeve 62. As shown in FIG. 5, the pilot ring 140 has an annular lower end surface 144 abutting an annular upper end surface 146 of the sleeve 62. The pilot ring 140 further has a cylindrical outer side surface 150 adjoining a cylindrical inner side surface 152 of the sleeve 62 in an interference fit. The two balls 126 fit within, and extend through, a corresponding pair of circular apertures 154 in the pilot ring 140.

The C-spring 142 extends partly around the pilot ring 140. A pair of opposite end portions 156 of the C-spring 142 engage the balls 126. The C-spring exerts a bias which urges the balls 126 radially inward of the apertures 154 in the pilot ring 140 so as to hold the balls 126 in rolling engagement with the cam surfaces 128 on the core 60.

FIG. 4 shows the core 60 in the rotationally centered position described above with reference to FIG. 2. When the core 60 and the sleeve 62 are rotated relative to one another from their centered positions, the cam surfaces 128 on the core 60 cam the balls 126 radially outward through the apertures 154 in the pilot ring 140. The C-spring 142 resists such movement of the balls 126 and urges the balls 126 back inward of the apertures 154 against the cam surfaces 128. The C-spring 142 thus applies a restoring force which urges the core 60 and sleeve 62 back toward their centered positions.

Figure 7:
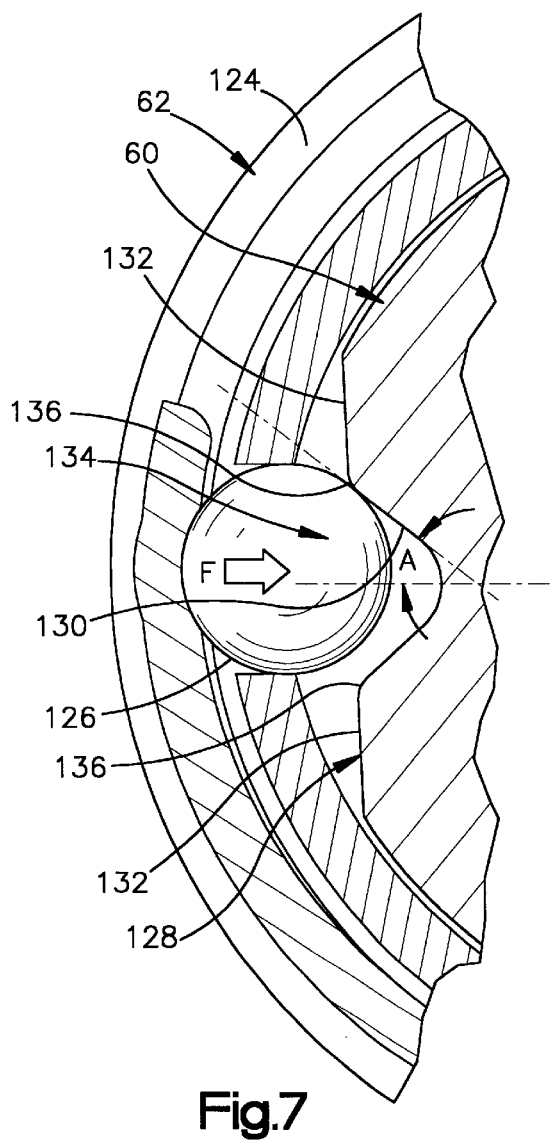
FIG. 7 also is an enlarged partial view of parts shown in FIG. 4, with certain parts being shown in different positions.

In accordance with a particular feature of the present invention, the configuration of the cam surfaces 128 enables the centering mechanism 120 to function in two different stages. The first stage occurs when the core 60 and the sleeve 62 are initially rotated from the centered positions of FIG. 4. In the first stage, the central portions 130 of the cam surfaces 128 act against the balls 126 in the recesses 134, as shown in FIG. 7. The central portions 130 then cam the balls 126 radially outward at a rate corresponding to the angle A at which the central portions 130 oppose the restoring force F of the C-spring 142. This causes the restoring force F to increase at a rate corresponding to the angle A during initial amounts of rotation of the core 60 relative to the sleeve 62.

Figure 8:
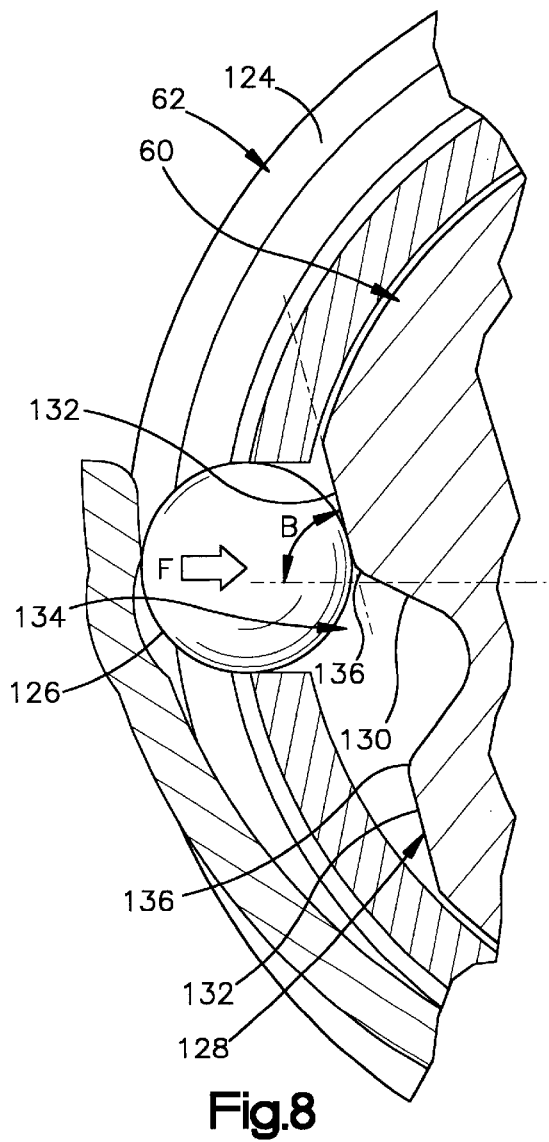
FIG. 8 is a view similar to FIG. 7 showing parts in different positions.

The second stage occurs when the core 60 has been rotated sufficiently for the balls 126 to emerge from the recesses 134. In the second stage, as shown in FIG. 8, a side portion 132 of each cam surface 128 moves against the corresponding ball 126. The side portions 132 then cam the balls 126 radially outward at a rate corresponding to the angle B at which the side portions 132 oppose the restoring force F of the C-spring 142. The angle B is greater than the angle A. The side portions 132 of the cam surfaces 128 thus move against the balls 126 with slopes that are less than the slopes of the central portions 130. This causes the restoring force F to increase at a second, lower rate corresponding to the greater angle B.

The restoring force F of the C-spring 142 is transmitted through the vehicle steering column as a torque which results in a corresponding restoring force at the steering wheel. Therefore, when the steering wheel is turned through a low angle from a straight ahead driving position, the driver will feel a restoring force that increases at a relatively high rate. When the steering wheel is turned through a greater steering angle, such as in a parking maneuver, the driver will feel a restoring force that increases at a relatively low rate.

In accordance with another particular feature of the present invention, the centering mechanism 120 can be installed after the valve 18 is balanced hydraulically. When the valve 18 is being balanced hydraulically, the centered positions of the core 60 and the sleeve 62 are located by directing a flow of hydraulic fluid through the valve 18, and by rotating the core 60 relative to the sleeve 62 until the neutral condition is obtained. The core 60 and the sleeve 62 are then interconnected with the torsion bar 28 (FIG. 1) in the centered positions. The pilot ring 140 can then be oriented circumferentially relative to the sleeve 62 such that the apertures 154 in the ring 140 are concentric with the cam surfaces 128 on the core 60. Accordingly, the present invention enables the centering mechanism 120 to be aligned circumferentially with the core 60 independently of the centered position of the core 60 relative to the sleeve 62.

From the above description of the invention, those skilled in the art will perceive improvements, changes and modifications. Such improvements, changes and modifications within the skill the of the art are intended to be covered by the appended claims.

Having described the invention, the following is claimed:

1. An apparatus comprising:

first and second relatively rotatable valve members having a common axis of rotation and being configured to direct hydraulic fluid between said valve members in accordance with their rotational positions; and a centering mechanism including a movable detent member, a C-spring, and a cam surface formed on one of said valve members, said C-spring partially encircling said one valve member, said C-spring engaging said detent member and biasing said detent member radially inward toward said common axis and said one valve member, said cam surface being rotatable with said one valve member so as to cam said detent member against the bias of said C-spring upon rotation of said valve members from centered positions and thereby apply a restoring force for urging said valve members back toward said centered positions, said C-spring being deflected radially outward by radially outward movement of said detent member upon rotation of said valve members from said centered positions;

said centering mechanism further comprising a pilot ring encircling said one valve member and having an aperture in which said detent member is movably disposed;

said cam surface having a central portion defining a recess in which said detent member rests when said valve members are in said centered positions, said recess having a pair of divergent side walls that project symmetrically from a radially extending central axis of said recess, one of said pair of divergent side walls acting against said detent member upon initial rotation of said valve members from said centered positions and camming said detent member radially outward from an at-rest first radial position to a second radial position at a first rate which corresponds to a first angle defined between said central axis of said recess and said one divergent side wall, said first angle thereby defining a first restoring force rate for said centering mechanism;

said cam surface further having a pair of side portions on opposite sides of said central portion, each of said pair of side portions of said cam surface having a planar contour, one of said pair of side portions acting against said detent member when said detent member is moved out of said recess by additional rotation of said valve members beyond said initial rotation, said one side portion camming said detent member radially outward from said second radial position to a third radial position at a second non-zero rate which corresponds to a second angle defined between said central axis of said recess and said one side portion, said second angle being greater than said first angle and defining a second restoring force rate for said centering mechanism that is lower than said first restoring force rate.

2. Apparatus as defined in claim 1 wherein said cam surface further has a pair of arcuate transition portions between said central portion and said side portions.

3. Apparatus as defined in claim 1 wherein said valve members are parts of a hydraulic fluid control valve in a vehicle steering gear, said central portion of said cam surface being movable against said detent member only during operation of said steering gear at relatively low steering angles, said side portions of said cam surface being movable against said detent member only during operation of said steering gear at relatively high steering angles.

4. Apparatus as defined in claim 1 wherein said centering mechanism further includes a movable second detent member located diametrically opposite said detent member, said second detent member being engaged by said C-spring and biased radially inward toward said one valve member by said C-spring.

5. Apparatus as defined in claim 4 wherein said detent member and said second detent member comprise balls.

* * * * *